July 31, 1934.  C. J. MADSEN  1,968,609
LAWN MOWER SHARPENING MEANS
Filed April 26, 1932  3 Sheets-Sheet 1

Inventor,
Carl J. Madsen,
By Minturn & Minturn,
Attorneys.

July 31, 1934.  C. J. MADSEN  1,968,609
LAWN MOWER SHARPENING MEANS
Filed April 26, 1932  3 Sheets-Sheet 2
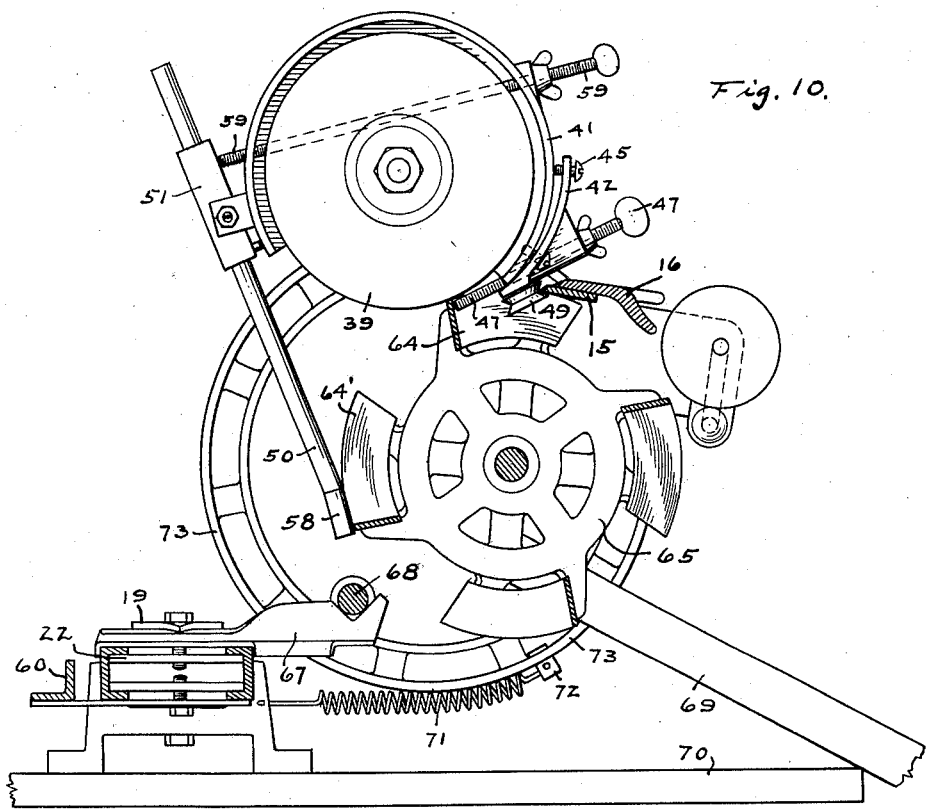
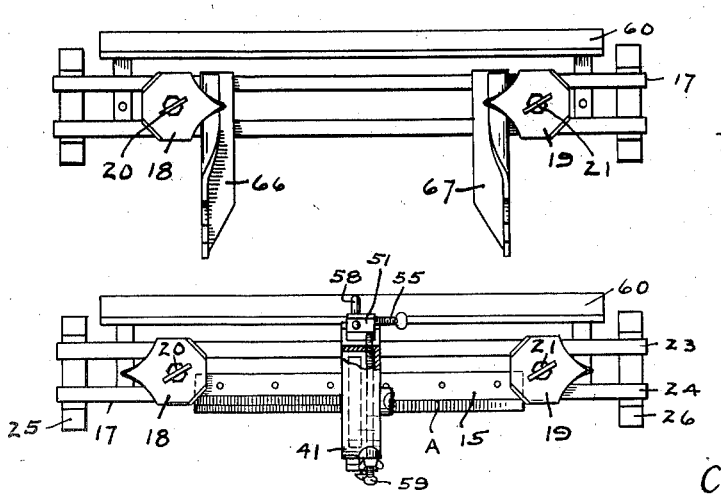
Inventor.
Carl J. Madsen,
By Minturn & Minturn,
Attorneys.

July 31, 1934.  C. J. MADSEN  1,968,609
LAWN MOWER SHARPENING MEANS
Filed April 26, 1932  3 Sheets-Sheet 3

Inventor,
Carl J. Madsen,
By Minturn Minturn,
Attorneys.

Patented July 31, 1934

1,968,609

UNITED STATES PATENT OFFICE 1,968,609

LAWN MOWER SHARPENING MEANS

Carl J. Madsen, Indianapolis, Ind., assignor of one-half to Daniel M. Alred, Indianapolis, Ind.

Application April 26, 1932, Serial No. 607,567

11 Claims. (Cl. 51—173)

This invention relates to the art of grinding machines and particularly to a mechanism to be employed to sharpen the cutting edges of the stationary and rotary knives of a lawn mower. One of the primary objects of the invention is to provide a grinding device which may be readily adjusted to various sizes and types of lawn mowers whereby in each case the rotary and stationary knives may be ground to give the desired clearance for proper cutting.

A further primary object of the invention is to provide in combination with a grinding wheel locating and guide means such that the knives on the rotary wheel may be ground to follow variations existing along the cutting edge of the stationary knife. A still further important object of the invention is to provide gauge means in combination with the grinding wheel whereby the wheel may be guided longitudinally of the cutting edge of the knife of the reel so as to maintain a constant cutting angle therealong.

Figure 1:
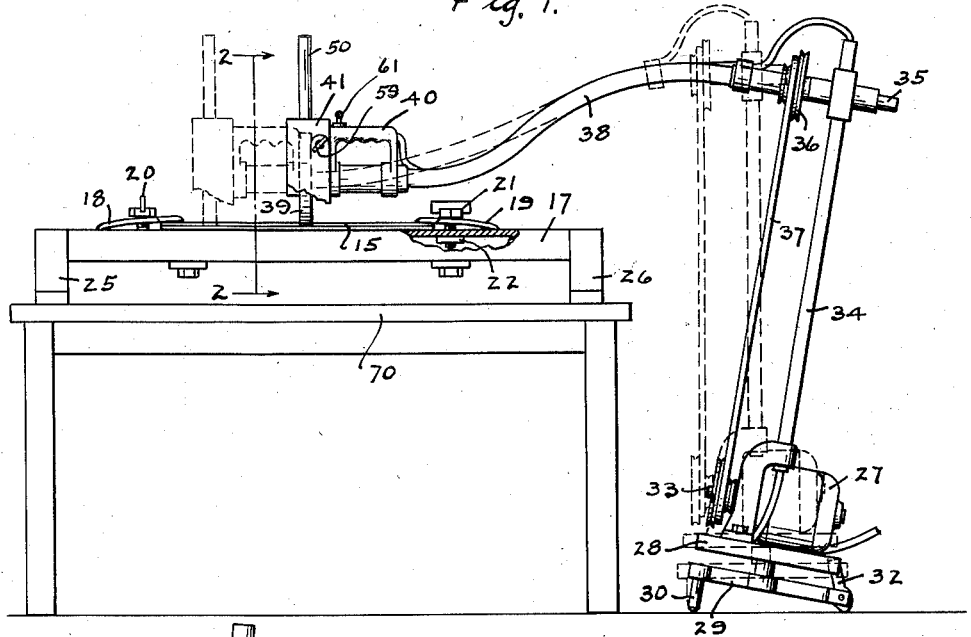
Figures 2, 3, 4, 5, 6:
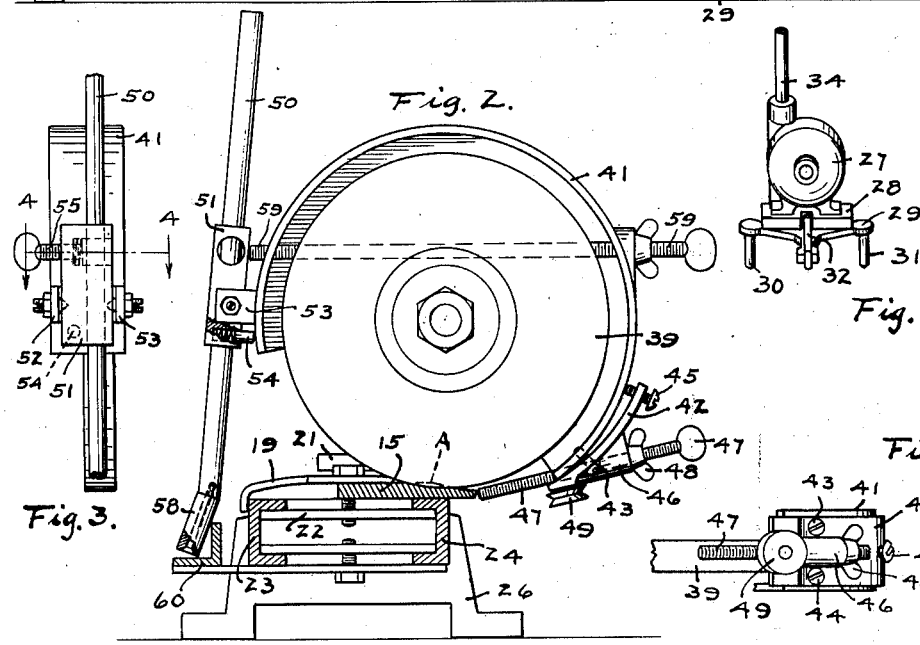
Figure 8:
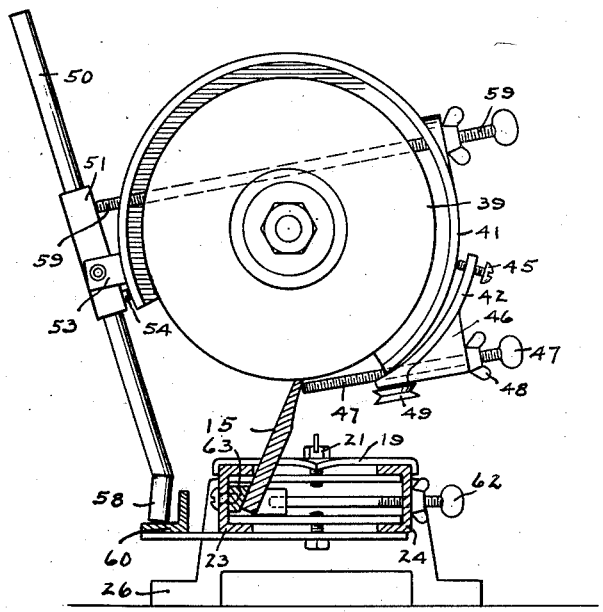

These and other objects and advantages such as arise from the particular combination of elements employed will become apparent in the following description of the invention as illustrated in one particular form in the accompanying drawings, in which Fig. 1 is a fragmentary front elevation of an assembly embodying my invention;

Fig. 2, a vertical transverse section on the line 2—2 in Fig. 1; showing the grinding wheel positioned after starting but before the completion of the grinding of a hollow in the blade; to the cutting edge of the blade;

Fig. 3, a detail in rear elevation of the guide post attaching means;

Fig. 4, a transverse horizontal section on the line 4—4 in Fig. 3 on an enlarged scale;

Fig. 5, a detail in bottom plan view of the knife edge gauges;

Fig. 6, a rear elevation of the driving motor and base;

Fig. 7, a fragmentary top plan view of the grinding head as employed in cutting the stationary knife;

Fig. 8, a transverse vertical section through the stationary knife and the supporting base showing the grinding head applied thereto in the position for cutting the knife edge;

Fig. 9, a top plan view of the base with mower supporting brackets carried thereby, and Fig. 10, a vertical transverse section through a lawn mower with the grinding head applied thereto as employed for grinding the cutting edges of the reel knives.

Like characters of reference indicate like parts throughout the several views in the drawings.

In employing my invention, the first operation is to remove the stationary knife 15 from the mower. The means of holding this knife 15 in place in the mower varies with the individual construction thereof as employed by various manufacturers. In some cases this knife is riveted to or is even an integral part of a transverse bar extending across the mower below the reel. In other cases the knife is detachably mounted on a bar 16 as here shown, Fig. 10, by screws so that the knife may be removed from the bar 16 without having to disturb other parts. Regardless of how the knife 15 may be held, it is taken from the mower either with its supporting bar or removed therefrom when possible as herein shown and is mounted on the top side of a bed 17 and secured thereon by means of the clamping plates 18 and 19 to be right side up and to have the forward edge preferably extending forwardly of the bench, Fig. 7. These plates 18 and 19 have thumb screws 20 and 21 respectively slidably passed therethrough and screw-threadedly engaged in transverse bars 22 therebelow to fit between the vertically disposed channel bars 23 and 24 (Fig. 2) which are fixed between the brackets 25 and 26 to form the bed 17. These plates 18 and 19 are so formed that they may be clamped down on the top side of the flat knife 15 to hold it rigidly in place or they may be turned around to have the pointed ends thereof engage over or through end-holes (not shown) of the knife retaining bar where the knife is not removed from that bar.

I employ a motor drive unit, Figs. 1 and 6, wherein a motor 27 is mounted on a platform 28 which in turn is swivelly mounted on a base 29. This base 29 is provided with two fixed legs 30 and 31 and a rockable leg 32 such that by rocking the leg 32 around and upwardly the base 29 may be lowered on the one side to have the other side held in the elevated position by the two legs 30, 31. The leg 32 is rocked around to drop into a slot appearing in the edge of the platform 28 so as to retain the platform in a fixed position against rotation. The drive shaft of the motor 27 is provided with a stepped pulley 33 and a post 34 is carried by the platform 28 to extend upwardly, and carried toward its upper end is a transverse shaft 35 on which is mounted a stepped or cone pulley 36. A drive belt 37 passes around the two pulleys as a means of driving the shaft 35 from the motor 27. A flexible shaft is carried from the end of the shaft 35 through a housing 38 in the usual manner and has a grinding wheel 39 connected thereto at its outer end.

A guide handle 40 is provided to support the outer end of the flexible shaft and a wheel guard 41 is fixed thereto to substantially enclose the major portion of the side of the wheel toward the handle and also of the periphery. The base 29 is turned in relation to the bed 17 to have the legs 30, 31 toward the bench and the leg 32 on the side of the base away from the bench and rocked upwardly whereby the post 34 is normally positioned to slope away from the end of the bed. Now by carrying the wheel 39 longitudinally along the bed 17 by means of the handle 40, the wheel may be carried to the left to rock the post 34 around toward the bed and as the wheel is carried to the right again, the weight of the motor unit will tend to pull the wheel along by reason of that weight having been fulcrumed about the legs 30 and 31.

The guard 41 is cut away from the lower side and on the lower front face thereof is mounted a knife edge gauge. This gauge comprises a bracket 42 secured to the guard by means of the screws 43, 44 which slidably pass through the bracket 42 and screw-threadedly engage the guard. These screws 43, 44 are located transversely across the bracket in relation to each other and are toward the lower end of the bracket. An adjusting screw 45 screw-threadedly passes through the outer or upper end of the bracket 42 to have its end abut the guard. Thus by running the screw 45 in or out through the bracket, the bracket may be rocked in relation to the guard. The bracket is provided with a boss 46 through which a thumb screw 47 screw-threadedly passes to beneath the wheel 39. By rocking the bracket 42 by means of the screw 45, the end of the screw extending to under the wheel may be shifted toward or away from the periphery of the wheel as required. A wing nut 48 is carried on the screw 47 as a means of locking the screw 47 at desired points of adjustment. A roller 49 having a V-shaped groove therearound is rotatably mounted on the under side of the bracket 42.

On the back side of the guard 41 is carried a guide post 50, longitudinally slidable through a block 51. This block 51 is rockably carried between the ears 52 and 53 extending rearwardly from the guard 41 so that the block 51 may swing in a plane parallel to the plane of rotation of the wheel 39. A spring pressed plunger 54 is carried by the block 51 to extend therefrom below the ears 52, 53 to yieldingly bear against the guard 41 so that the block 51 is normally rocked thereby to throw the upper end around toward the housing or guard 41. The post 50 may be adjusted longitudinally through the block 51 and secured in selected positions by means of the thumb screw 55 which screw-threadedly passes through the block 51 to carry a disk 56 against a flat side of the post 50. A spring 57 presses the disk 56 into frictional engagement with the post 50 so that although the screw 55 may be withdrawn the post 50 will yieldingly remain at any position. The lower end of the post 50 is cut off to receive thereagainst the end of a roller 58 whose axis is at an angle with that of the post 50.

Referring now to Figs. 1, 2 and 7, the wheel 39 is brought down against the upper side of the knife 15 and the screw 47 is adjusted to bear against the forward edge of the knife and the post 50 is also adjusted vertically through the block 51 and also in a rocked position by means of a screw 59 which passes through the guard 41 from the forward side between the wheel 39 and the guard and back through the rear side of the guard to abut the block 51 above the ears 52, 53. Both the screws 47 and 59 are suitably adjusted to bring the grinding wheel 39 to that position over the knife 15 as indicated in Fig. 2 which will cause the wheel to cut away the shoulder A which is left at the upper end of that face of the knife 15 against which the knives of the reel have been in contact. The correct position of the wheel 39 as just indicated is maintained by allowing the rear end of the screw 47 to bear against the front edge of the knife 15 and to have the roller 58 bear downwardly against the angle-bar 60 which extends along the rear side of the bed 17. Now by shifting the wheel 39 longitudinally along the knife 15 by means of the handle 40, the shoulder A may be cut away to give the desired clearance. The motor 27 is preferably controlled by means of a switch 61 mounted conveniently on the top side of the handle 40.

Following the initial cutting action of cutting away the shoulder A for clearance on the top side of the knife 15 as above indicated, the knife 15 is removed from under the plates 18 and 19 and is set on edge as indicated in Fig. 8, to have the cutting edge of the knife turned upwardly and forwardly. A suitable clamp screw 62 is screw-threadedly passed through the front channel bar 24 to bear against the lower or rear part of the knife 15 to rock it back against a block 63 so that the knife 15 does not rest vertically but is inclined forwardly somewhat. The grinding wheel 39 is then brought over the top edge of the knife thus positioned and the screw 47 is brought against the then forward side of the knife while the screw 59 is also adjusted to rock the post 50 as its lower end bears or rests on the angle bar 60 so that the edge of the knife 15 may be ground off to form an angle slightly less than 90 degrees with the face being contacted by the screw 47 and to form a sharp corner thereby. The wheel 39 is shifted longitudinally along this edge of the knife 15 to complete the grinding thereon, following which grinding the knife 15 is then returned to its normal position in the mower as indicated in Fig. 10. The knives 64 of the reel 65 are then to be sharpened.

In order to place the mower in a suitable position and to there support it, I provide the brackets 66 and 67 which are clamped down by the plates 18 and 19 on the bed 17 to extend forwardly therefrom and the upper sides of these brackets are provided with the notches across which the tie bar 68 of the mower may rest to support the mower in an inverted position with the handle 69 thereof extending downwardly against any suitable support here shown as the edge of the table 70. The handle 69 may of course be removed but this is not necessary and the exact position of the mower as supported in relation to the bed 17 makes no difference insofar as the cutting action is concerned since the position is merely determined for the convenience of the operator.

Now to sharpen a knife blade 64 of the reel, I bring the grinding wheel 39 to over that particular blade and also revolve the reel so that the roller 49 is brought against the cutting edge of the knife 15, the back end of the screw 47 against the blade 64 and the roller 58 against the next adjacent blade 64'. Now by shifting the wheel 39 longitudinally the roller 49 bearing against the edge of the knife 15 will maintain the wheel 39 in parallel alignment therewith and the contacting of the screw 47 with the one blade being ground and the roller 58 with the next adjacent blade will also maintain the wheel 39 at the required position to give the desired cutting angle on the edge of the knife. Moreover, since the screw 47 bears against the side of the knife, the reel 65 will be revolved as the wheel 39 is shifted along the knife. In order to maintain the knife 64 securely against the screw 47 I provide a spring tensioning device comprising a spring 71 fixed by one end to the bed 17 and carrying by its free end a bracket 72 adapted to engage the wheel 73 of the mower so as to rock the wheel in the direction which will tend to revolve the reel 65 to carry the blade 64 firmly against the end of the screw 47. It is to be noted that by reason of the roller 49 guiding the wheel 39 from the cutting edge of the knife 15, the reel knife or blade 64 will be ground in strict conformance with any variation appearing in the knife 15. Also attention is directed to the fact that the roller 58 bears against the edge of the next blade 64' in such a manner that the rocking of the wheel 39 around over the edge of the blade 64 is limited thereby so that the amount as well as the angle of grinding along the edge of the blade 64 is adjustably controlled.

While I have here shown and described my invention in the form as now best known to me, it is obvious that structural changes may be made therein without departing from the spirit of the invention and I, therefore, do not desire to be limited to that precise form beyond the limitations as may be required by the following claims.

I claim:

1. In a sharpening device for lawn mowers having a stationary blade and a reel blade, a grinding unit adapted to be moved parallel with the stationary blade and guided solely by contact with the stationary blade and reel blade, said unit comprising a grinding wheel, a post rockably mounted back of the wheel to be shiftable parallel to the plane of rotation of the wheel and to bear against a guiding member of the mower, a stop adjustably located below the wheel to engage and guide the reel blade being ground, and means carrying said post and said stop fixed stationary in respect to rotation of the wheel but fixed to be shiftable therewith.

2. In a sharpening device for lawn mowers having a stationary blade and a reel blade, a grinding unit adapted to be moved parallel with the stationary blade and guided solely by contact with the stationary blade and reel blade, said unit comprising a grinding wheel, a post rockably mounted back of the wheel to be shiftable parallel to the plane of rotation of the wheel and to bear against a guiding member of the mower, a stop adjustably located below the wheel to engage and guide the reel blade being ground, and means carrying said post and said stop fixed stationary in respect to rotation of the wheel but fixed to be shiftable therewith, and a roller revolubly carried forward of said stop.

3. In a sharpening device for lawn mowers having a stationary blade and a reel blade, a grinding unit adapted to be moved parallel with the stationary blade and guided solely by contact with the stationary blade and reel blade, said unit comprising a grinding wheel, a post rockably mounted back of the wheel to be shiftable parallel to the plane of rotation of the wheel and to bear against the tangential face of a reel blade, a stop adjustably located below the wheel to engage and guide the reel blade being ground, and means carrying said post and said stop fixed stationary in respect to rotation of the wheel but fixed to be shiftable therewith, said stop comprising a member adapted to be extended to and retracted from under the periphery of the wheel.

4. In a sharpening device for lawn mowers having stationary and rockable blades, a power driven grinding unit adapted to be guided solely by contact with the stationary and revolving blades of the mowing machine comprising a shiftable grinding wheel, a post rockably mounted back of the wheel to be shiftable parallel to the plane of rotation of the wheel, a stop adjustably located below the wheel, and means carrying said post and said stop fixed stationary in respect to rotation of the wheel but fixed to be shiftable therewith, said stop comprising a member adapted to be extended to and retracted from under the periphery of the wheel, and a bracket carrying the stop adapted to be rocked to vary the angle of the member with the wheel.

5. In a grinding device for lawn mowers having stationary and rotary reel knives, a shiftable power driven unit movable parallel with the stationary knife and guided in such movement and at a definite angular relation thereto solely by guides bearing upon the reel and stationary knives of the machine, said unit comprising a grinding wheel, a guard about the wheel, a post rockably supported from the rear of the guard, a reel knife stop carried toward the lower end of the forward side of the guard, a stationary knife roller spaced forwardly of the stop on the guard, and means for adjusting the angularity of said post in respect to said wheel, said stop being adapted to bear against the reel knife being ground with said roller in contact with the stationary knife, and said post being adjusted to bear against the next adjacent knife on the reel.

6. In a grinding device for lawn mowers having stationary and rotary reel knives, a shiftable power driven unit movable parallel with the stationary knife and guided in such movement and at a definite angular relation thereto solely by guides bearing upon the reel and stationary knives of the machine, said unit comprising a grinding wheel, a guard about the wheel, a post rockably supported from the rear of the guard, a reel knife stop carried toward the lower end of the forward side of the guard, a stationary knife roller spaced forwardly of the stop on the guard, and means for adjusting the angularity of said post in respect to said wheel, said stop being adapted to bear against the reel knife being ground with said roller in contact with the stationary knife, and said post being adjusted to bear against the next adjacent knife on the reel, a motor drive unit, a base supporting the unit having a pair of legs over which said unit may be fulcrumed, and a flexible shaft drive from the unit to said wheel, said unit being so located that as the wheel is advanced along the mower knife, said unit is rocked over said legs.

7. In a grinding device for lawn mowers having a knife and a knife holding bed, a manually shiftable power driven grinding unit for use with the bed for holding the stationary knife of the mower, said unit guided solely by contact against the face of the knife and face of the bed, said unit and said bed comprising a grinding wheel adapted to be shifted longitudinally of the bed, a guard about the wheel, a post mounted on the guard to extend down therebehind, and be rockable toward and away from the wheel, means for limiting the rearward rotation of the lower end of the post, a stop extending from the guard directed rearwardly under the wheel, and a guide on the bed for directing the lower end of said post.

8. In a grinding device for lawn mowers having a stationary knife and a reel knife, a rotatable grinding unit adapted to be moved parallel with the stationary knife and guided solely by guides bearing upon the stationary knife and a knife of the reel, a grinding wheel, a guard about the wheel, a post rockably supported from the rear of the guard, a reel knife stop carried toward the lower end of the forward side of the guard, a stationary knife roller spaced forwardly of the stop on the guard, and means for adjusting the angularity of said post in respect to said wheel, said stop being adapted to bear against the reel knife being ground with said roller in contact with the stationary knife, and said post being adjusted to bear against the next adjacent knife on the reel, and means yieldingly holding said reel knife against said stop.

9. In a sharpening device for lawn mowers having a stationary blade and a revolving blade, a shiftable grinding unit adapted to be guided solely by the stationary and revolving blades of the mower, said unit comprising a grinding wheel with means for rotating it, and adjustable guide means for engaging the stationary blade, the blade of the reel being ground and the adjacent reel blade.

10. In a sharpening device for lawn mowers having a stationary blade, a frame to which the stationary blade is clamped, a face on the frame parallel with the blade and unobstructed by the blade, and a power driven rotatable grinding wheel unit adapted for movement along the blade and guided solely by guides on the unit engaging the blade and the face on the frame while the blade is clamped on the frame.

11. In a sharpening device for lawn mowers having a stationary blade, a frame to which the stationary blade is clamped, a face on the frame parallel with the blade and unobstructed by the blade, and a power driven rotatable grinding wheel unit adapted for movement along the blade and guided solely by guides on the unit engaging the blade and the face on the frame while the blade is clamped on the frame, said guide means being adjustably mounted relative to the grinding wheel to determine the angle, location and depth of cut made by the grinding wheel.

CARL J. MADSEN.